US009895736B2

(12) United States Patent
Terazawa et al.

(10) Patent No.: US 9,895,736 B2
(45) Date of Patent: Feb. 20, 2018

(54) COVER MANUFACTURING METHOD AND PRESS DIE USED IN SAME (71) Applicant: Uchiyama Manufacturing Corp., Okayama (JP)

(72) Inventors: Hiroshi Terazawa, Okayama (JP); Teruyuki Kiyoshi, Okayama (JP)

(73) Assignee: Uchiyama Manufacturing Corp., Enami, Naka-Ku, Okayama-Shi, Okayama (JP)

( * ) Notice: Subject to any disclaimer, the term of this patent is extended or adjusted under 35 U.S.C. 154(b) by 215 days.

(21) Appl. No.: 14/397,214

(22) PCT Filed: Apr. 24, 2013

(86) PCT No.: PCT/JP2013/062043
§ 371 (c)(1),
(2) Date: Oct. 27, 2014

(87) PCT Pub. No.: WO2013/161869
PCT Pub. Date: Oct. 31, 2013

(65) Prior Publication Data
US 2015/0190860 A1   Jul. 9, 2015

(30) Foreign Application Priority Data

Apr. 27, 2012  (JP) ................................ 2012-103352

(51) Int. Cl.
*B21D 37/10* (2006.01)
*B21D 22/02* (2006.01)
(Continued)

(52) U.S. Cl.
CPC ........... *B21D 37/10* (2013.01); *B21D 5/0209* (2013.01); *B21D 22/02* (2013.01); *B21D 22/20* (2013.01);
(Continued)

(58) Field of Classification Search
CPC ........ B21D 22/28; B21D 22/30; B21D 53/10; B21D 5/0209; B21D 37/10; B21D 53/12;
(Continued)

(56) References Cited

U.S. PATENT DOCUMENTS 2,980,046 A * 4/1961 McGregor ............. B21D 37/10
                                                          72/350
4,060,845 A * 11/1977 Bowers ................. H01F 13/006
                                                          361/149
(Continued)

FOREIGN PATENT DOCUMENTS

CN    101890476 A    11/2010
EP    2620294 A1    7/2013
(Continued)

*Primary Examiner* — R. K. Arundale
*Assistant Examiner* — Mohammad Yusuf
(74) *Attorney, Agent, or Firm* — Bacon & Thomas, PLLC (57) ABSTRACT A manufacturing method of a cover by bending a non-magnetic metal sheet, the cover being provided between an annular magnet fixed to a rotary member and a magnetic sensor detecting magnetism generated from the annular magnet, and a press die having a first die and a second die configured to be able to approach to and depart from each other. The method includes a bending step of bending the metal sheet by using a forming machine of which contact portion with the metal sheet is a non-magnetized portion. The press die presses and bends a non-magnetic metal sheet, and the first die and the second die include non-magnetic portions on a part of press faces configured to press the metal sheet, respectively, the non-magnetic portions facing each other.

15 Claims, 8 Drawing Sheets (51) Int. Cl.
*B21D 22/20* (2006.01)
*F16C 33/72* (2006.01)
*B21D 5/02* (2006.01)
*B21D 22/28* (2006.01)
*F16C 41/00* (2006.01)
*B21D 53/10* (2006.01)
*B21D 22/26* (2006.01)
*F16C 19/18* (2006.01)
*B21D 37/01* (2006.01)

(52) U.S. Cl.
CPC ............. *B21D 22/26* (2013.01); *B21D 22/28* (2013.01); *B21D 53/10* (2013.01); *F16C 33/723* (2013.01); *F16C 41/007* (2013.01); *B21D 37/01* (2013.01); *F16C 19/186* (2013.01); *F16C 2326/02* (2013.01)

(58) Field of Classification Search
CPC ........ B21D 22/26; B21D 22/20; B21D 22/02; B60B 7/0013; F16C 33/723
USPC .................................................. 72/348, 347
See application file for complete search history.

(56) References Cited

U.S. PATENT DOCUMENTS

| | | | | |
|---|---|---|---|---|
| 4,761,536 | A | * | 8/1988 | Blakeley .................. B23K 9/08 219/123 |
| 5,490,407 | A | * | 2/1996 | Doose .................. B21D 22/105 72/57 |
| 7,425,295 | B2 | * | 9/2008 | Mizuta .................... B60T 8/329 264/427 |
| 2007/0172164 | A1 | | 7/2007 | Takada |
| 2011/0254356 | A1 | * | 10/2011 | Yamamoto .......... B60B 27/0005 301/109 |
| 2012/0279271 | A1 | * | 11/2012 | Carter ................... H05B 6/101 72/342.8 |

FOREIGN PATENT DOCUMENTS

| | | | |
|---|---|---|---|
| JP | 2007218426 A | | 8/2007 |
| JP | 2000192181 A | | 7/2011 |
| JP | 201266661 A | | 4/2012 |
| KR | 20030012385 A | * | 2/2003 |

* cited by examiner

COVER MANUFACTURING METHOD AND PRESS DIE USED IN SAME

TECHNICAL FIELD

The present invention relates to a manufacturing method of a cover used in ABS (anti-lock brake system) of automobile and provided between an annular magnet fixed to a rotary member and a magnetic sensor for detecting magnetism generated from the annular magnet and further to a press die used for the method.

BACKGROUND ART

In the above-mentioned ABS, an annular magnet (encoder) provided with N-poles and S-poles alternately in the circumferential direction is fixed to an inner ring, i.e. a driven wheel, of a hub bearing. A magnetic sensor is provided on a fixed side, thereby detecting magnetism change following rotation of the annular magnet and determining rotating condition of wheels. A cover is attached to the fixed side in order to prevent damage of the annular magnet caused by dirty water and dust, referring to the following Patent Literature 1 as an example. Such a cover is constituted with non-magnetic metal easily transmitting magnetism, for example, SUS304, aluminum, copper, brass, or the like, for accuracy of magnetic detection, because the cover is provided between the annular magnet and the magnetic sensor. The non-magnetic metal is pressed to form a predetermined shape like a cap of the cover.

CITATION LIST

Patent Literature

PTL 1: JP-2007-218426-A

SUMMARY OF INVENTION

Technical Problem

When the cover is made of non-magnetic metal as mentioned above, the cover is magnetized by the process following plastic deformation such as pressing, thereby generating residual magnetism in the cover. When such a cover is provided between the annular magnet and the magnetic sensor, magnetism generated from the magnetic sensor is adversely affected while passing through the cover, thereby deteriorating detection accuracy of the magnetic sensor. In Patent Literature 1, the above-mentioned problem is to be solved by demagnetizing the non-magnetic metal constituting the cover, namely the non-magnetic metal is demagnetized after being pressed to be the shape of a cover.

However, in Patent Literature 1, since every manufactured cover is demagnetized separately, manufacturing of a cover requires a great number of man-hours, thereby causing a new problem in the manufacturing efficiency.

The present invention is proposed in view of the above-mentioned problems and has an object to provide a cover manufacturing method capable of efficiently manufacturing a cover and inhibiting residual magnetism as much as possible when the cover is manufactured by bending non-magnetic material and to provide a press die for the method.

Solution to Problem

In one aspect of the present invention, in a manufacturing method of a cover by bending a non-magnetic metal sheet, the cover being provided between an annular magnet fixed to a rotary member and a magnetic sensor detecting magnetism generated from the annular magnet, the method comprises a bending step of bending the metal sheet by using a forming machine of which contact portion with the metal sheet is a non-magnetized portion.

In the foregoing aspect, a portion contacting the metal sheet, of the forming machine for manufacturing the cover by bending the metal sheet, is non-magnetized. Increase of residual magnetism in the cover is inhibited without demagnetizing the manufactured cover. Therefore, non-magnetizing step is not required for the manufactured cover, thereby improving the production efficiency.

In the manufacturing method of the cover of the foregoing aspect of the present invention, in the bending step the forming machine can be a press die having a press face, the press face having a portion which is a non-magnetized portion, the portion contacting a region of the cover which the magnetism passes through.

In the foregoing aspect, the bending step is executed using a versatile press mold. The press face of the press die includes the non-magnetized portion contacting the magnetism-passing portion of the cover. Therefore, increase of residual magnetism in the portion of the metal sheet contacting the non-magnetized portion is inhibited during pressing.

When the press die is used as a forming machine, the press die can be made of magnetic material, and the non-magnetized portion is formed by demagnetizing the press die.

In the above-mentioned aspect, when the press die is made of magnetic material, the non-magnetized portion is constituted by demagnetizing the press die before pressing, and the portion of the metal sheet contacting the non-magnetized portion is not magnetized during pressing.

When the press die is used as a forming machine, the press die can be made of magnetic material, and the non-magnetized portion is formed by inserting a non-magnetic body into the press die. In the foregoing aspect, when magnetic force is generated from the press die made of magnetic material, at least a part of the metal sheet contacting the non-magnetized portion is not magnetized during pressing. The non-magnetized portion is made of non-magnetic body, thereby magnetic force generated from the press die is kept weak for a long time.

When the press die is used as a forming machine, the press face can have a step-shaped portion configured to transfer a stepped shape; the non-magnetized portion can form a part of the step-shaped portion; and in the bending step the metal sheet can be processed by the step-shaped portion to be tubular-shaped with a bottom including a stepped portion.

When the cover is processed to be tubular with the bottom having the stepped portion, the stepped portion tends to be easily magnetized because of large plastic deformation. However, in the foregoing aspect, the stepped portion is inhibited from being magnetized even in case of manufacturing the tubular cover with the bottom having the stepped portion.

In the manufacturing method of the cover of the foregoing aspect of the present invention, the method can further include a molding step of integrally molding material after the bending process, the molding step using a die formed along the shape of the bent metal sheet, the die having a fitting face, the fitting face having a portion contacting the region which the magnetism passes through, the portion being the non-magnetized portion.

In the foregoing aspect, residual magnetism in the metal sheet is inhibited from increasing when the molding material is integrally molded with the metal sheet after the bending step.

In the manufacturing method of the cover of the foregoing aspects of the present invention, the method may further include an inspection step of inspecting residual magnetism in the bent metal sheet using a weakly magnetic tool or a non-magnetic tool as a tool contacting the metal sheet, after the bending step. In foregoing aspect, on inspecting residual magnetism, increase of residual magnetism in the cover is inhibited when the tool contacts the metal sheet during inspection because the tool for inspection is weakly magnetic or non-magnetic.

In the manufacturing method of the cover of the foregoing aspects of the present invention, the metal sheet can be an austenitic stainless steel sheet.

In the foregoing aspect, the austenitic stainless steel sheet commonly used for cover material is non-magnetic but is easily magnetized by plastic deformation. However, in the invention, the austenitic stainless steel sheet commonly used for the cover is not magnetized.

In a press die in another aspect of the present invention, the press die has a first die and a second die configured to be able to approach to and depart from each other, the press die pressing and bending a non-magnetic metal sheet, the first die and the second die including non-magnetic portions on a part of press faces configured to press the metal sheet, respectively, the non-magnetic portions facing each other.

In the foregoing aspect, when the non-magnetic metal sheet is pressed, the press face of the metal sheet contacting the non-magnetized portion is inhibited from being magnetized.

In the press die of the foregoing aspect of the present invention, the first die and the second die can be made of magnetic material and the non-magnetized portion is formed by demagnetizing the press die.

In the foregoing aspect, when a part of the press face generates magnetism during manufacturing of the press die, the metal sheet is not magnetized during pressing because the portion of the press portion is demagnetized before pressing, thereby inhibiting increase of residual magnetism in the manufactured cover.

In the press die of the foregoing aspect of the present invention, the first die and the second die can be made of magnetic material and the non-magnetized portion can be formed by inserting a non-magnetic body into the press die.

In the foregoing aspect, the metal sheet is not magnetized at the portion where the non-magnetic body is inserted during pressing of the metal sheet. The non-magnetized portion is constituted with the non-magnetic body, thereby magnetic force generated from the press face is kept weak for a long time.

Advantageous Effects of Invention

In one aspect of the present invention, in the cover manufacturing method, increase of residual magnetism in the metal sheet is inhibited as much as possible when the cover is manufactured by bending a metal sheet of non-magnetic material with the forming machine. Demagnetizing process is not required for each manufactured cover, thereby improving manufacturing efficiency. In another aspect of the present invention, increase of residual magnetism is inhibited as much as possible when the cover is manufactured by bending the metal sheet of non-magnetic material, thereby improving manufacturing efficiency.

BRIEF DESCRIPTION OF DRAWINGS

FIG. 1a and FIG. 1b are partially broken views diagrammatically showing the cover manufacturing method and the press die of an embodiment of the present invention. FIG. 1a shows that the metal sheet is inserted between the first and the second dies and FIG. 1b shows that the metal sheet is pressed by the first and the second dies.

DESCRIPTION OF EMBODIMENTS

Figure 7:
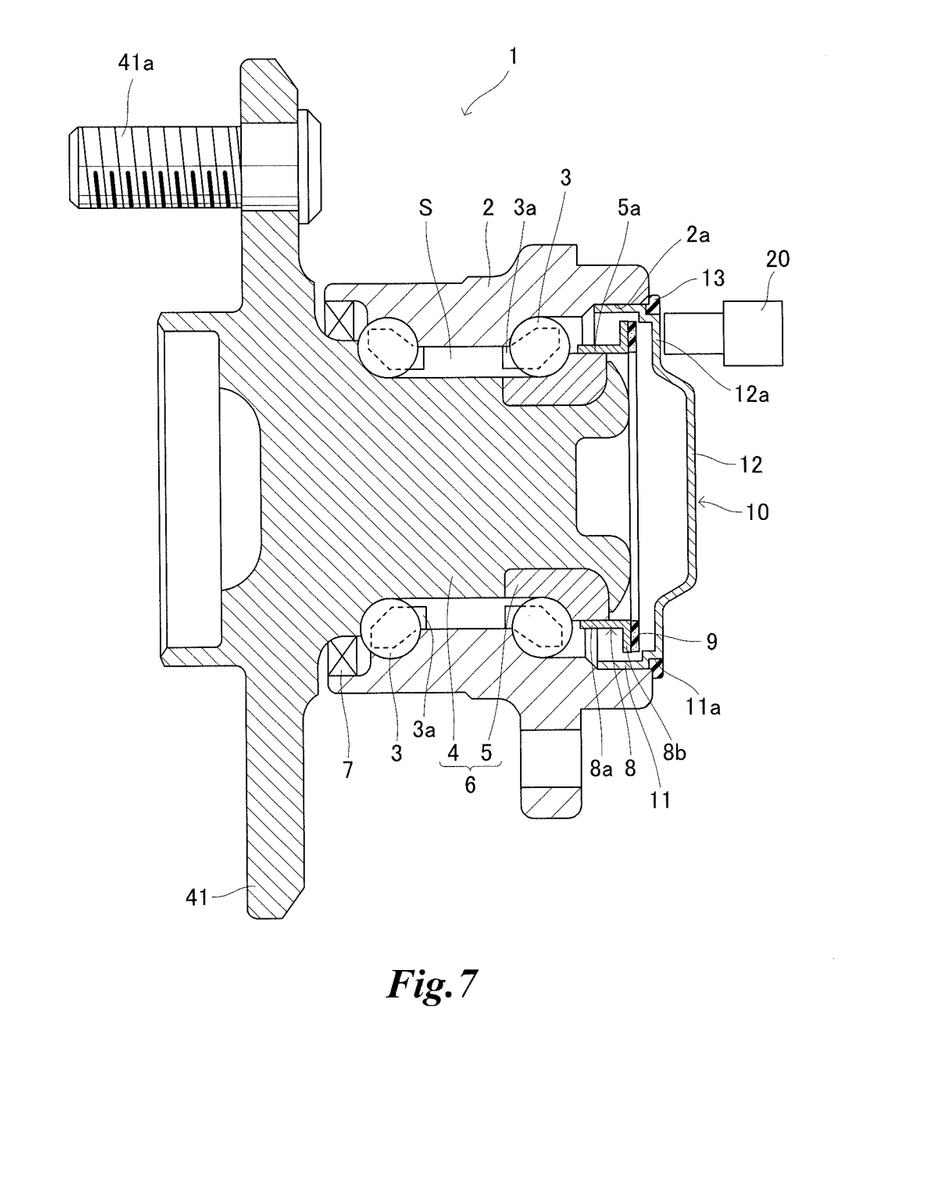
FIG. 7 is a longitudinally sectional view showing that the cover manufactured by the embodiment of the present invention is mounted to a bearing device.

The embodiment of the present invention is explained referring to the attached drawings. Referring to FIG. 7, a bearing device mounted with a cover manufactured by the production method and the die of the embodiment of the present invention is explained. The bearing device of FIG. 7 shows a hub bearing as an example of the bearing device rotatably supporting the driven wheel of an automobile. In the hub bearing (bearing device) 1 of the figure, a hub wheel 4 and an inner ring 5 (sometimes called an annular member) are rotatably supported around the axial center via two rows of rolling elements 3 . . . (ball) in the inner diametrical portion of an outer ring member 2 fixed to the vehicle body, not shown in the figure. The hub wheel 4 has a hub flange 41 and the driven wheel (tire wheel, not shown in the figure) is attached to the hub flange 41 with a bolt 41a. The hub wheel 4 and the inner ring 5 constitute an inner ring member 6 as a rotary member and the rolling elements 3 . . . are provided between the outer ring member 2 and the inner ring member 6 while being held by a retainer 3a. The space between the outer ring member 2 including the inserted rolling elements 3 . . . and the inner ring member 6 is defined as a bearing space S. Lubricant such as grease, is filled in the bearing space S for smoothly rotating the rolling elements 3 . . . .

A seal ring 7 of an axial seal type is provided between the outer ring member 2 and the inner ring member 6 (hub wheel 4) in the end portion on the wheel side, of the bearing space S, the seal ring 7 being slidable to the inner ring member 6 (hub wheel 4). A cylindrical portion 8a of the reinforcement metal ring 8 with L-shaped section is integrally fitted to an outer diametrical face 5a in the end portion on the vehicle body side, of the inner ring member 6 (inner ring 5). A circular disk portion 8b perpendicular to the axial center extends from one end of the cylindrical portion 8a. The disk portion 8b is formed in the shape of an outward flange and an annular magnet 9 is fixed to the face on the vehicle body side. The annular magnet 9 is an annular multi-pole magnet in which rubber material or resin material (rubber material in the figure) is mixed with magnetic powder, the mixture is annularly molded and is magnetized by providing a plurality of N-poles and S-poles alternately in the circumferential direction. However, an annular multi-pole magnet made of a sintered body can also be used. On the inner diametrical face 2a in the end portion, on the vehicle body side, of the outer ring member 2, a cover 10 obtained by pressing a non-magnetic metal sheet according to the following production method is attached close to the annular magnet 9 so as to cover the annular magnet 9. The cover 10 with a bottom has a cylindrical portion 11 and a lid portion 12, the cylindrical portion 11 being fitted to the inner diametrical face 2a of the outer ring member 2 from the vehicle body side and the lid portion 12 extending from the end portion, on the vehicle body side, of the cylindrical portion 11 so as to cover the end portion, on the vehicle body side, of the outer ring member 2. The lid portion 12 has a stepped portion 12a at a portion facing the annular magnet 9. An annular seal portion 13, made of molding material such as rubber, is integrally molded at a corner 11a of the internally angled shape corresponding to the connection of the cylindrical portion 11 and the lid portion 12, to be mentioned later. A magnetic sensor 20 is provided on the outer side (vehicle body side), of the cover 10 so as to face the annular magnet 9 and the cover 10 is provided between the magnetic sensor 20 and the annular magnet 9. The magnetic sensor 20 detects magnetic change following rotation of the annular magnet 9. The cover 10 is provided in an air gap between the annular magnet 9 and the magnetic sensor 20 and the cover 10 is desirably made of a non-magnetic metal sheet, preferably an austenitic stainless steel sheet so as to pass through magnetic flux generated from the annular magnet 9.

Figure 1A:
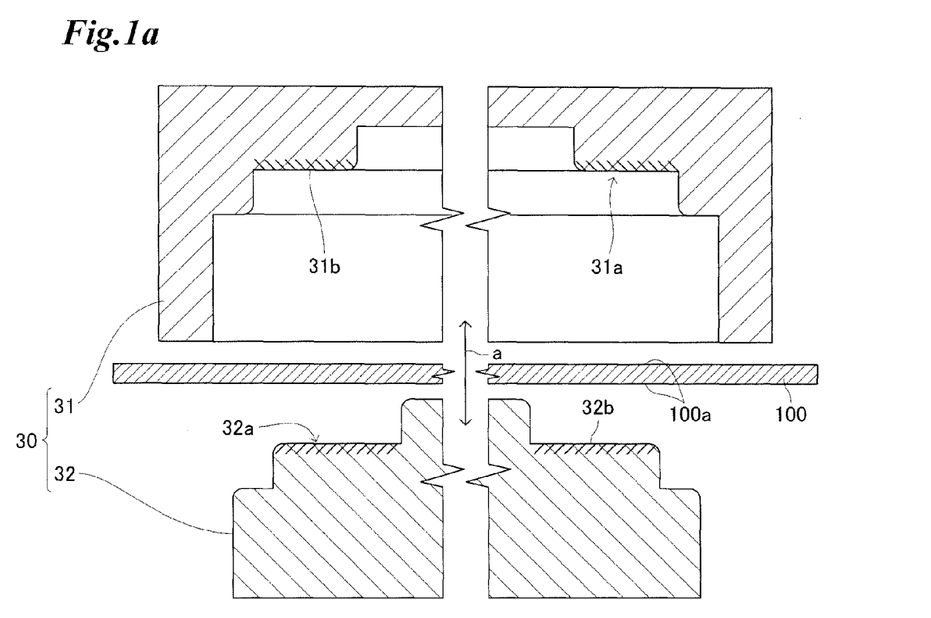
Figure 1B:
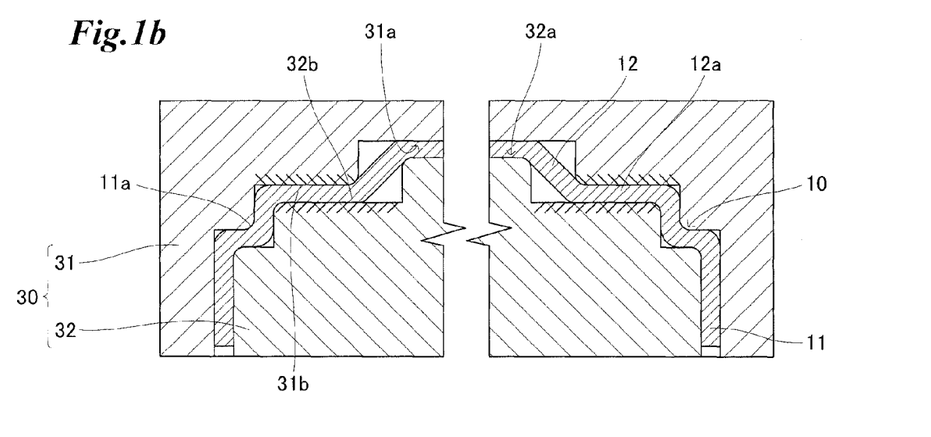
Figure 2A:
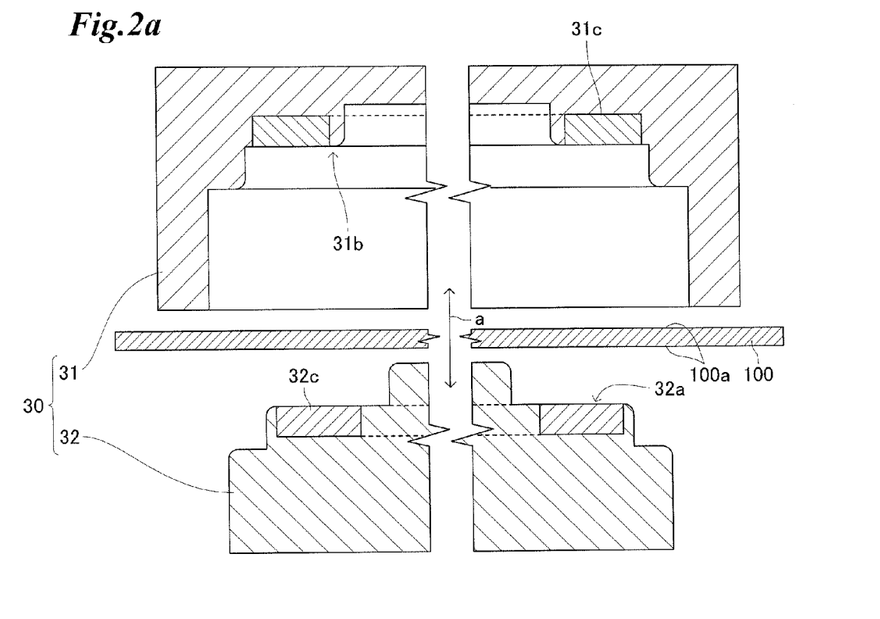
FIG. 2a and FIG. 2b show similar views to FIG. 1a and FIG. 1b and diagrammatically show the cover manufacturing method and the press die of another embodiment of the present invention.
Figure 2B:
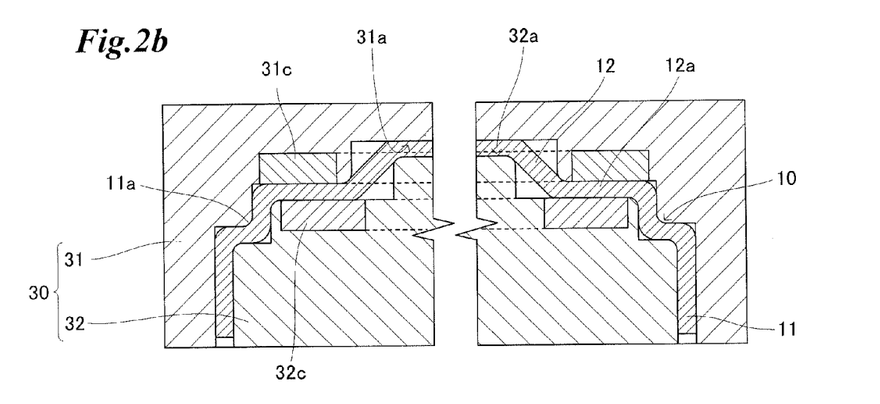

Referring to FIG. 1 and FIG. 2 showing the cover production method and the press die of one embodiment of the present invention, a production method of the above-mentioned cover 10 is explained. FIG. 1a and FIG. 1b show that a non-magnetic metal sheet 100 is pressed and the above-mentioned cover 10 is manufactured using a press die 30 having a first die 31 and a second die 32, the dies being capable of approaching and departing. The first die 31 and the second die 32 are respectively a concave mold (female mold) and a convex mold (male mold) having a concave press face 31a corresponding to the outer shape of the cover 10 and a convex press face 32a corresponding to the inner shape of the cover 10. The dies 31, 32 are formed so as to be able to approach to and depart from each other. The press faces 31a, 32a of the first and the second dies 31, 32 include step-shaped portions 31b, 32b corresponding to the stepped portion 12a, respectively, the press face 31a facing the step-shaped portion 31b and the press face 32a facing the step-shaped portion 32b. The step-shaped portions 31b, 32b face at least a part of a face 100a to be pressed of the metal sheet 100 configured to be pressed with the first die 31 and the second die 32. The first die 31 and the second die 32 are demagnetized in advance and the press faces 31a, 32a having the step-shaped portions 31b, 32b, referring to the cross-hatching portion, are formed as facing non-magnetized portions. Non-magnetized portion, herein, refers to a region which is not magnetized or a region with weak magnetism which is not magnetized at the time of pressing the metal sheet 100, namely a region of the press face so as not to magnetize the metal sheet 100 when the non-magnetic metal sheet 100 is pressed by plastic deformation.

As shown in FIG. 1a, the metal sheet 100 is provided between the first die 31 and the second die 32 and the dies 31, 32 are approximated by a driving mechanism, not shown in the figure, so as to fit the second die 32 into the first die 31. The press faces 31a, 32a act on the metal sheet 100 provided between the dies 31, 32 when the dies 31 and 32 are fitted, thereby transferring the shape of the press surfaces 31a, 32a to the metal sheet 100. The metal sheet 100 is bent accompanying plastic deformation and the cover 10 with a bottom having the cylindrical portion 11 and the lid portion 12 as shown in FIG. 1b is manufactured. The stepped portion 12a is formed in such a manner that the shape of the step-shaped portions 31b, 32b is transferred to the metal sheet 100 and the portions of the metal sheet 100 corresponding to the step-shaped portions 31b, 32b are largely deformed by plastic deformation. When the metal sheet 100 is made of non-magnetic material, the metal sheet 100 becomes easily magnetized as plastic deformation proceeds. Therefore, residual magnetism increases in the metal sheet 100 when the metal sheet 100 is pressed at a magnetized portion. However, in the embodiment of the present invention, the press faces 31a, 32a contacting the metal sheet 100 are not magnetized. Increase of residual magnetism in the stepped portion 12a is inhibited because the region contacting the stepped portion 12a is not magnetized even when the stepped portion 12a becomes easily magnetized after large plastic deformation. Therefore, the manufactured cover 10 is not required to be separately demagnetized, thereby improving manufacturing efficiency of the cover 10. Since the first die 31 and the second die 32 are demagnetized as a whole, the entire press faces 31a, 32a constitutes a non-magnetized portion and generation of residual magnetism in the entire metal sheet 100 is inhibited.

In this embodiment, the first die 31 and the second die 32 are demagnetized as a whole. When the metal sheet 100 is used as the cover, the press faces 31a, 32a partially contacting the region of the metal sheet 100 through which magnetism passes are required to be non-magnetized. Further, the step-shaped portions 31b, 32b of the press die 30 can be demagnetized; or wide area of the press faces 31a, 32a including the step-shaped portions 31b, 32b can be demagnetized.

The manufactured cover 10 is mounted so as to close the opening, on the vehicle body side, of the outer ring member 2 by fitting the cylindrical portion 11 from the vehicle body side to the inner diametrical face 2a, on the vehicle body side, of the outer ring member 2 as shown in FIG. 7. The ends of the bearing space S on the vehicle body side and on the wheel side are sealed together with the seal ring 7, therefore dirty water and dust are prevented from entering the bearing space S from outside, and lubricant filled in the bearing space S is prevented from leaking outside. Specifically, on the vehicle body side, the cover 10 is mounted so as to cover the annular magnet 9, and the annular magnet 9 is not damaged by dust, thereby achieving long-life of the annular magnet 9. The stepped portion 12a is positioned so as to face the vehicle body side of the annular magnet 9 while the cover 10 is mounted on the outer ring member 2. Magnetism generated from the annular magnet 9 passes through the stepped portion 12a and is detected by the magnetic sensor 20 provided on the vehicle body side. At the time of pressing with the press die 30, the step-shaped portions 31b, 32b corresponding to the stepped portions 12a are not magnetized, so that increase of residual magnetism in the stepped portion 12a is inhibited. Therefore, magnetism generated from the annular magnet 9 does not affect the magnetic sensor 20 even if magnetism passes through the cover 10 and the magnetic sensor 20 is able to accurately detect magnetic change following rotation of the inner ring member 6. In addition, the cover 10 is reinforced by the stepped portion 12a and is inhibited from deformation while being fitted by pressure into the end portion, on the vehicle body side, of the outer ring member 2.

FIG. 2a and FIG. 2b diagrammatically show the cover manufacturing method and the press die of another embodiment of the present invention. In FIG. 2a and FIG. 2b the non-magnetic metal sheet 100 is pressed and the above-mentioned cover 10 is manufactured using the press die 30 having the first die 31 and the second die 32, the dies being capable of moving along the arrow "a", namely capable of approaching and departing. The shape of the first die 31 and the second die 32 is the same as those of the first embodiment. However, structure of the non-magnetized portion is different. In this embodiment, annular non-magnetic bodies 31c, 32c are inserted to the first die 31 and the second die 32 corresponding to the step-shaped portions 31b, 32b, respectively. The step-shaped portions 31b, 32b, i.e. a part of the press faces 31a, 32a, are constituted by partially exposing the non-magnetic bodies 31c, 32c. The press face 31a and the press face 32a include non-magnetic portions facing each other as mentioned above.

In this embodiment, as shown in FIG. 2a, the metal sheet 100 is provided between the first die 31 and the second die 32 and the dies 31, 32 are approximated by a driving mechanism, not shown in the figure, so as to fit the second die 32 into the first die 31. The metal sheet 100 provided between the dies 31, 32 is bent accompanying plastic deformation by the press faces 31a, 32a when the dies 31 and 32 are fitted. Thus, the cover 10 with a bottom having the cylindrical portion 11 and the lid portion 12 as shown in FIG. 2b is obtained. As mentioned above, the stepped portion 12a is formed when the metal sheet 100 is largely deformed by plastic deformation by the stepped shaped portions 31b, 32b. The non-magnetic bodies 31c, 32c (for example, SUS304, aluminum, resin, titanium or the like) are inserted to the dies 31, 32 corresponding to the step-shaped portions 31b, 32b. The non-magnetic bodies 31c, 32c are formed between the stepped portion 12a and the magnetized portions of the first die 31 and the second die 32 so as to keep enough distance to reduce magnetism in order not to affect the metal sheet 100. Since the step-shaped portions 31b, 32b are not magnetized, increase of residual magnetism in the stepped portion 12a is inhibited, even when the metal sheet 100 is largely deformed by plastic deformation. Therefore, the manufactured cover 10 is not required to be separately demagnetized, thereby improving manufacturing efficiency of the cover 10.

Other structures and advantageous effects are the same as those in the first embodiment. The common members have the same reference numerals and their explanation is omitted.

Figure 3:
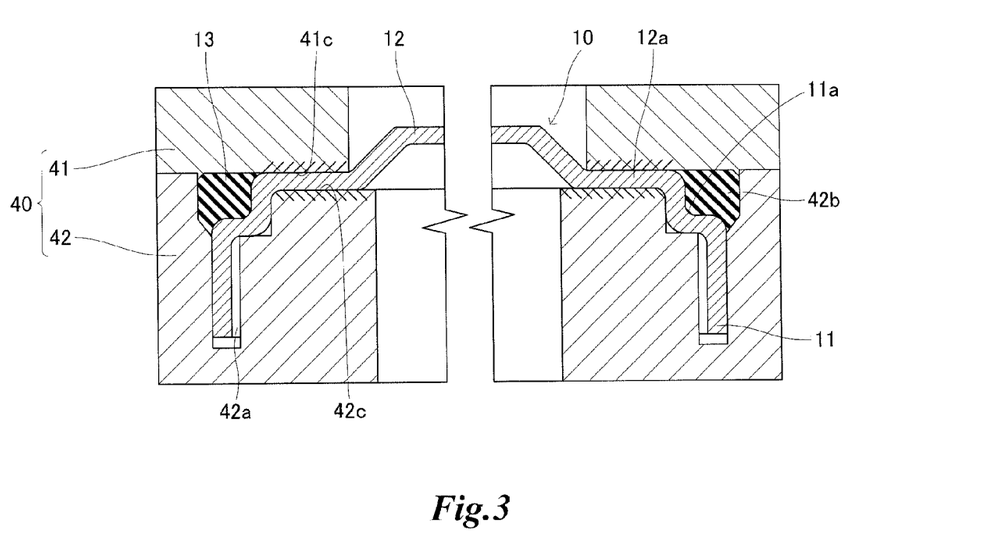
FIG. 3 is a partially broken view showing one molding step added to the production method of the first and the second embodiments.

FIG. 3 shows another embodiment of the cover manufacturing method in which a molding step is added to the first and the second embodiments of the cover production method (the embodiment is referred to as the third embodiment). The third embodiment is provided with an integral molding step after the bending step and uses a molding die which is formed along the shape of the bent metal sheet and has a fitting face, a part of the fitting face contacting the region where magnetism passes through and being non-magnetized. A molding die 40 in the figure has an upper mold 41 and a lower mold 42 being made of magnetic material. A cavity 42a of the lower mold 42 contains a part of the cylindrical portion 11 and the lid portion 12 formed by the bending step and has a hollow space 42b corresponding to the corner 11a, being connection of the cylindrical portion 11 and the lid portion 12. The upper mold 41 is clamped to the lower mold 42, unvulcanized rubber material (molding material) is injected to the hollow space 42b from an inlet, not shown in the figure, and the injected material is hardened by vulcanization, thereby a seal portion 13 is integrally formed as a molded body of the molding material at the corner 11a. When the cover 10 having the seal portion 13 at the corner 11a is mounted to the end portion, on the vehicle body side, of the outer ring member 2 as shown in FIG. 7, the seal portion 13 is provided under compression between the inner diametrical face 2b, on the vehicle body side, of the outer member and the corner 11a of the cover 10. Therefore, dirty water passing the fitting face of the cylindrical portion 11 and the inner diametrical face 2b is prevented from entering the bearing space S.

The upper die 41 and the lower die 42 are made of magnetic bodies and are demagnetized in advance. Therefore, fitting faces 41c, 42c corresponding to the stepped portions 12a of the cover 10 are non-magnetized portions as defined above. Even when the fitting faces 41c, 42c of the upper die 41 and the lower die 42 contact the cover 10 in case that a seal portion 13 is molded by vulcanized rubber material with the molding die 40 at the corner 11a of the cover 10 manufactured by bending (bent metal sheet), increase of residual magnetism in the cover 10 is inhibited. The embodiment is not limited in that the upper die 41 and the lower die 42 are demagnetized as a whole. The fitting faces 41c, 42c can be demagnetized or a wider area including the fitting faces 41c, 42c can be demagnetized.

Figure 4:
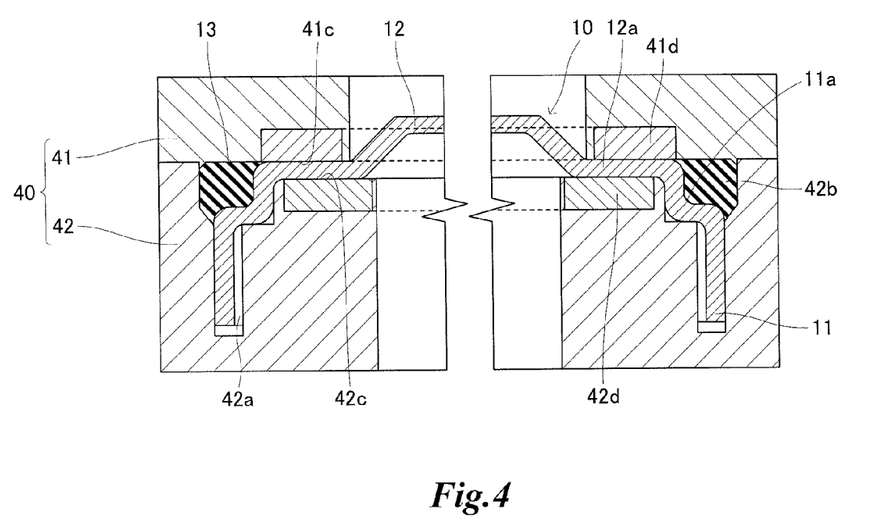
FIG. 4 is a similar view to FIG. 3 and shows another embodiment of the molding step.

FIG. 4 shows another embodiment (called the fourth embodiment) with the above-mentioned molding step added. In the fourth embodiment, the molding die 40 also has the upper die 41 and the lower die 42 made of magnetic bodies as mentioned above. The cavity 42a of the lower die 42 has a similar shape to the cavity 42a in the third embodiment. Unvulcanized rubber material (molding material) is injected to the hollow space 42b from the inlet, not shown in the figure, and the injected material is hardened by vulcanization, thereby the seal portion 13 is integrally formed as a molded body of the molding material at the corner 11a, as mentioned above. However, annular non-magnetic bodies 41d, 42d are inserted to the fitting faces 41c, 42c of the upper and the lower dies 41, 42 corresponding to the stepped portions 12a of the cover 10 so as to expose. The exposed portions of the non-magnetic bodies 41d, 42d are the non-magnetized portion as defined above. When the seal portion 13 is formed by molding unvulcanized rubber at the corner 11a of the cover 10 manufactured by bending (bent metal sheet) using the molding die 40, increase of residual magnetism in the cover 10 caused by clamping of the molding die 40 is inhibited.

Figure 5:
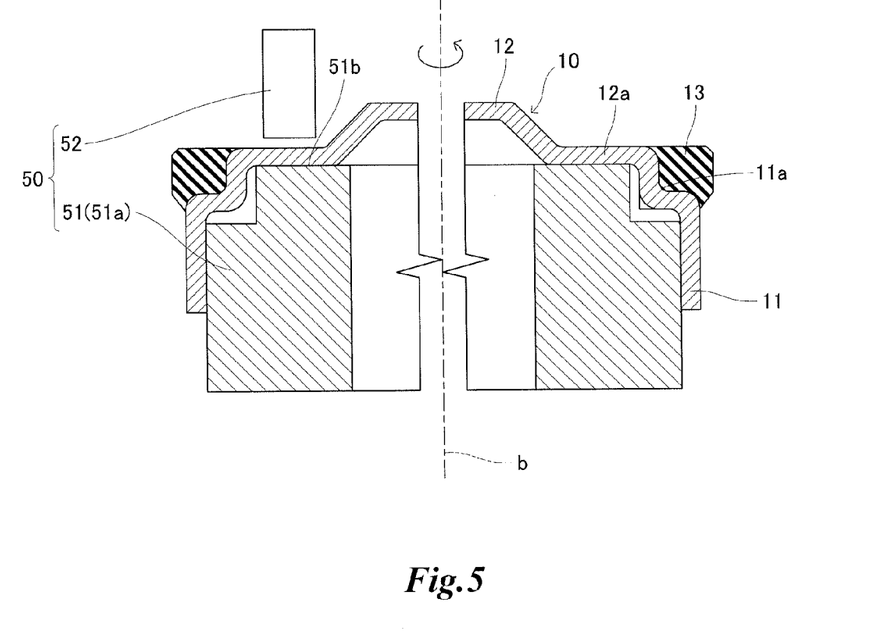
FIG. 5 is a partially broken sectional view showing one embodiment of an inspection step added to the production method of the above-mentioned embodiments.

FIG. 5 is a partially broken sectional view showing one embodiment of an inspection step added to the production method of the first and the second embodiments (figures show the first to the fourth embodiments). Residual magnetism of the manufactured cover 10 is measured in the inspection step. An inspection device 50 in the figure has an inspection table 51 (jig) of chuck type rotating around the center "b" and a gaussmeter 52. The inspection table 51 has a plurality of divided members 51a and each divided member 51a is movable in the diametrical direction around the center "b". The divided member 51a, displaced in the centrifugal direction, contacts under pressure the inner face of the cylindrical portion 11 of the cover 10, thereby the cover 10 is fixed to the inspection table 51. In such a fixed condition, the stepped portion 12a of the cover 10 is supported by an upper face 51b of the divided member 51a. A detection face of the gaussmeter 52 is approached to the upper face of the stepped portion 12a, the detection table 51 is rotated around the center "b" by a driving apparatus, not shown in the figure, then residual magnetism is measured by the gaussmeter 52. The entire detection table 51 or a part thereof including the upper face 51b is made of a weakly magnetic body or a non-magnetic body (for example, SUS304, aluminum, resin or titanium), thereby increase of residual magnetism in the cover 10 is inhibited while the cover 10 is fixed to the inspection table 51 and the residual material is detected. When the inspection table 51 is made of a magnetic body, the upper face 51b can be the non-magnetized portion by demagnetizing the inspection table 51. The object to be demagnetized is not limited to the entire inspection table 51 and only the upper face 51b can be demagnetized.

In FIG. 5, residual magnetism of the cover 10 after the molding step (the third and the fourth embodiments) is detected. However, residual magnetism is desirably detected between the molding step and the press step (bending process) as shown in FIG. 6.

Figure 6:
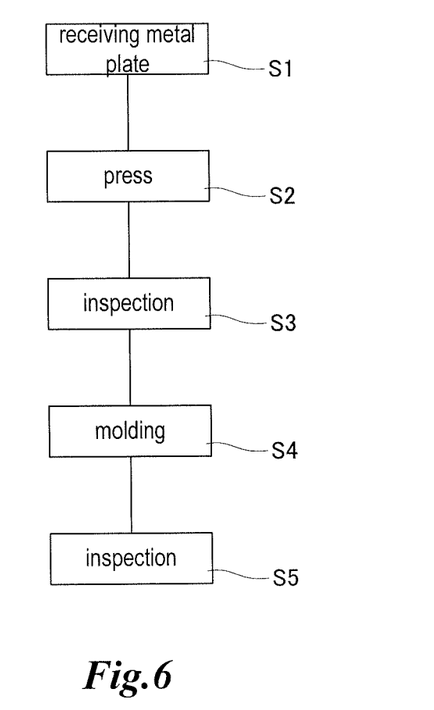
FIG. 6 is a flow chart diagrammatically showing the production method of the embodiment of the present invention.

FIG. 6 is a flow chart diagrammatically showing the cover manufacturing method of the above-mentioned embodiments of the present invention. In FIG. 6, the metal sheet 100 is inserted in the press die 30 in a step S1 and is bent by the press die 30 in a step S2. In a step S3, residual magnetism in the cover 10 manufactured in the step S2 is measured by the inspection device shown in FIG. 5. The seal portion 13 is molded in a step S4 and residual magnetism in the cover 10 provided with the seal portion 13 is measured. When the seal portion 13 is not molded, the step 3 becomes the final step.

Figure 8:
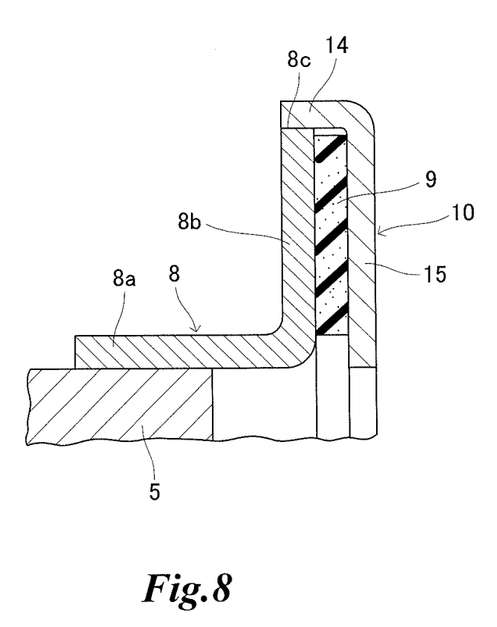
FIG. 8 is a modification of the cover manufactured by the embodiment of the present invention and shows the essential sectional view when the cover is mounted to the object.

FIG. 8 is a modified embodiment of the cover manufactured by the embodiment of the present invention and shows the essential sectional view when the cover is mounted to the object different from that in FIG. 7. The cover 10 is mounted to the end portion on the vehicle body side, of the outer ring member 2 so as to close the opening on the vehicle body side, of the outer ring member 2 in FIG. 7. In FIG. 8, the cover 10 is mounted by caulking to an outer circumference 8c of the circular disk portion 8b of the reinforcement ring 8 fixed with the annular magnet 9. The cover 10 in this embodiment is manufactured by bending a non-magnetic metal sheet as mentioned above. The cover 10 has a short cylindrical portion 14 to be mounted by caulking to the outer circumference 8c of the disk portion 8b and an annular disk portion 15 inwardly (in the centripetal direction) extending from the end portion of the vehicle body side of the cylindrical portion 14. The annular disk portion 15 is configured to contact the face on the vehicle body side, of the annular magnet 9 when the cover 10 is mounted to the outer circumference 8c. Therefore, magnetism generated from the annular magnet 9 passes through the annular disk portion 15 and is detected by the magnetic sensor 20 (referring to FIG. 7). The annular magnet 9 is mostly covered with the cylindrical portion 14 and the annular disk portion 15, thereby the annular magnet 9 is prevented from being damaged by dust entering from outside and is able to be used for a long time.

The cover 10 in this embodiment is manufactured by bending a non-magnetic metal sheet using a press die, not shown in the figure. Of course, the shape of the press die corresponds to the shape of the cover 10. A part of the press die corresponding to the annular disk portion 15 is demagnetized in advance or is formed with the facing non-magnetized portion by inserting a non-magnetic body. Therefore, the manufactured cover 10 is not required to be separately demagnetized, thereby improving manufacturing efficiency.

In the above-mentioned embodiments, the cover 10 is made of austenitic stainless steel sheet. However, the metal sheet in the embodiments of the present invention is not limited to the austenitic stainless steel sheet. Non-magnetic metal sheet of aluminum, copper or brass can be used. In the above-mentioned embodiments, the cover is manufactured by bending with a press die. However, a spinning machine can be used as a molding machine and a cover can be manufactured by deforming the metal sheet by plastic deformation. In such a case, a portion (for example, a mold or a pressing roller) contacting the metal sheet is required to be the non-magnetized portion during the spinning step. The shape of the cover is not limited to those shown in the figures. The lid portion 12 of the cover 10 in the first and the second embodiments can be flat without the stepped portion 12a. The cover manufactured in the embodiments of the present invention is not limited to be in the stepped form. A contracted portion having a tapered shape in the diametrical section can be formed instead of the stepped portion 12a. The molding die 40 for the molding step is not limited and several types of dies can be used.

REFERENCE SIGNS LIST 6 inner ring member (rotary member)
9 annular magnet
10 cover
12a stepped portion
100 steel plate (metal sheet)
20 magnetic sensor
30 press die (forming machine)
31 first die
32 second die
31a, 32a press face
31b, 32b step shaped portion
31c, 32c non-magnetic body
40 molding die
41c, 42c fitting face
51a inspection table (jig for inspection device)
13 seal portion (molded body of molding material)

The invention claimed is:

1. A manufacturing method for a cover comprising the steps of:
providing a non-magnetic metal sheet and a press die having a first die and a second die;
placing the non-magnetic metal sheet between the first die and the second die: and
bending the non-magnetic metal sheet by the press die, whereby the nonmagnetic metal sheet is pressed by the press die, the first die and the second die each having a non-magnetized portion contacting the non-magnetic metal sheet, wherein:
the non-magnetized portion is formed by demagnetizing the press die as a whole; and
the cover being made by bending the non-magnetic metal sheet and is configured to mount between an annular magnet fixed to a rotary member and a magnetic sensor detecting magnetism generated from the annular magnet.

2. The manufacturing method of the cover as set forth in claim 1, wherein, the non-magnetized portion contacts a region of the metal sheet, the region through which the magnetism passes.

3. The manufacturing method of the cover as set forth in claim 2, wherein the press die is made of magnetic material, and the non-magnetized portion is formed by demagnetizing the press die.

4. The manufacturing method of the cover as set forth in claim 2, wherein the press die is made of magnetic material, and the non-magnetized portion is formed by inserting a non-magnetic body into the press die.

5. The manufacturing method of the cover as set forth in claim 2, wherein the non-magnetized portion of press face of the press die forms a part of a step-shaped portion, the step-shaped portion being configured to transfer a stepped shape
wherein in the bending step the metal sheet is processed by the step-shaped portion to be tubular-shaped with a bottom including a stepped portion.

6. The manufacturing method of the cover as set forth in claim 1, wherein the manufacturing method further comprises an inspection step of inspecting residual magnetism in the bent metal sheet using a weakly magnetic tool or a non-magnetic tool as a tool contacting the metal sheet, after the bending step.

7. The manufacturing method of the cover as set forth in claim 1, wherein the metal sheet is an austenitic stainless steel sheet.

8. The manufacturing method of the cover as set forth in claim 3, wherein the non-magnetized portion of press face of the press die forms a part of a step-shaped portion, the step-shaped portion being configured to transfer a stepped shape and
wherein in the bending step the metal sheet is processed by the step-shaped portion to be tubular-shaped with a bottom including a stepped portion.

9. The manufacturing method of the cover as set forth in claim 2, wherein the manufacturing method further comprises a molding step of integrally molding material after the bending process, the molding step using a molding die formed along the shape of the bent metal sheet, the molding die having a fitting face, the fitting face having the non-magnetized portion contacting a region through which the magnetism passes.

10. The manufacturing method of the cover as set forth in claim 3, wherein the manufacturing method further comprises a molding step of integrally molding material after the bending process, the molding step using a molding die formed along the shape of the bent metal sheet, the die having a fitting face, the fitting face having the non-magnetized portion contacting a region of the cover, the region through which the magnetism passes.

11. The manufacturing method of the cover as set forth in claim 2, wherein the manufacturing method further comprises an inspection step of inspecting residual magnetism in the bent metal sheet using a weakly magnetic tool or a non-magnetic tool as a tool contacting the metal sheet, after the bending step.

12. The manufacturing method of the cover as set forth in claim 3, wherein the manufacturing method further comprises an inspection step of inspecting residual magnetism in the bent metal sheet using a weakly magnetic tool or a non-magnetic tool as a tool contacting the metal sheet, after the bending step.

13. The manufacturing method of the cover as set forth in claim 2, wherein the metal sheet is an austenitic stainless steel sheet.

14. The manufacturing method of the cover as set forth in claim 3, wherein the metal sheet is an austenitic stainless steel sheet.

15. The manufacturing method as set forth in claim 1, further comprising:
a molding step of integrally molding material after the bending step, said molding step using a molding die formed along the shape of the bent metal sheet, the molding die being made of magnetic material and having a fitting face, the fitting face having a non-magnetized portion contacting a region of the cover, the region through which the magnetism passes, the non-magnetized portion of the molding die being formed by demagnetizing the molding die as a whole.

* * * * *